(12) United States Patent
Szasz (10) Patent No.: US 8,820,757 B2
(45) Date of Patent: Sep. 2, 2014

(54) UNIVERSAL PAINT TRAY CART

(71) Applicant: Attila Szasz, Chandler, AZ (US)

(72) Inventor: Attila Szasz, Chandler, AZ (US)

(*) Notice: Subject to any disclaimer, the term of this patent is extended or adjusted under 35 U.S.C. 154(b) by 0 days.

(21) Appl. No.: 14/048,257

(22) Filed: Oct. 8, 2013

(65) Prior Publication Data

US 2014/0097587 A1    Apr. 10, 2014

Related U.S. Application Data

(60) Provisional application No. 61/711,463, filed on Oct. 9, 2012.

(51) Int. Cl.
*B65D 21/028* (2006.01)
*B62B 5/00* (2006.01)
*B44D 3/12* (2006.01)

(52) U.S. Cl.
CPC .............. *B62B 5/0093* (2013.01); *B44D 3/126* (2013.01)
USPC ..................... 280/79.2; 220/23.86; 220/23.87

(58) Field of Classification Search
USPC ........ 280/79.11, 79.2, 79.5; 220/23.83–23.88
See application file for complete search history.

(56) References Cited

U.S. PATENT DOCUMENTS 5,002,293 A * 3/1991 Gottselig ................... 280/47.35

* cited by examiner

*Primary Examiner* — Jeffrey J Restifo
*Assistant Examiner* — Erez Gurari
(74) *Attorney, Agent, or Firm* — Schmeiser, Olsen & Watts LLP (57) ABSTRACT

The disclosed universal paint tray cart has a top surface for setting various sizes of paint trays on, wheels for moving the universal paint tray cart and one or more paint tray coupling devices. Each paint tray coupling device is coupled to a slot opening in the universal paint tray cart body. Each paint tray coupling device has a first end that is coupled to the slot opening of the universal paint tray cart, and a second end which couples to a paint tray. The paint tray coupling devices hold the paint tray to the universal paint tray cart so that the cart and the paint tray can be moved about without the paint tray falling off of the universal paint tray cart. The paint tray coupling devices slide along the length of the slot openings to adjust to the size of the paint tray being held.

11 Claims, 10 Drawing Sheets

UNIVERSAL PAINT TRAY CART

CROSS REFERENCE TO RELATED APPLICATION

This application claims priority to U.S. Provisional Patent Application to Attila Szasz entitled "Universal Paint Tray Cart" Ser. No. 61/711,463 filed Oct. 9, 2012, the disclosure of which is hereby incorporated entirely herein by reference.

BACKGROUND OF THE INVENTION

1. Technical Field

This invention relates to painting supplies and in particular to a paint tray cart that can accept different sizes of paint trays.

2. State of the Art

Painting walls and ceilings of buildings is often done using a paint roller and a paint tray. Paint is poured into the paint tray. A paint roller is placed into the paint in the paint tray in order to cover the roller with paint. The roller is then rolled over the surface to be painted, applying the paint to the surface. Often the painter has to paint from a ladder or scaffold, and/or with an extended paint roller in order to reach high surfaces. The painter needs easy access to the paint tray, and needs to be able to move the paint tray about easily from one position to another. Often different colors of paint are being used, and it is desirable to have the capability to easily position paint trays with different colors, as well as clean and reuse the paint trays. Paint trays with wheels have been used, but these tend to be bulky and difficult to clean and carry about. It is desirable to have a mobile cart-type apparatus which allows a paint tray to be removeably attached to and moved about with the tray.

Accordingly, what is needed is a universal paint tray cart which can be used to hold paint trays in a range of sizes, and which can be moved easily by the painter from one area to another while safely and securely holding the paint tray.

DISCLOSURE OF THE INVENTION

This invention relates to painting supplies and in particular to a paint tray cart that can accept different sizes of paint trays. Disclosed is a paint tray cart that includes a cart body, a slot opening and a paint tray coupling device. The cart body includes a top surface for receiving a paint tray. The slot opening extends through the cart body, with a slot length extending between a slot first end and a slot second end. The paint tray coupling device is configured to couple the paint tray to the cart body. A first end of the paint tray coupling device couples the paint tray coupling device to the slot opening of the cart body. A second end of the paint tray coupling device is configured to removeably couple to a paint tray. In some embodiments the paint tray coupling device slides along the length of the slot opening from the slot first end to the slot second end. In some embodiments the paint tray coupling device is captured by the slot opening in response to the paint tray coupling device being coupled to the slot opening. In some embodiments the slot length is at least one inch long. In some embodiments the slot length is at least three inches long.

In some embodiments the paint tray coupling device includes an eyelet bolt; a clip coupled to an eyelet bolt hole end of the eyelet bolt, where the clip is configured to removably couple to the paint tray; and a wing nut threaded onto a threaded end of the eyelet bolt. In some embodiments the paint tray coupling device includes a spring; an eyelet bolt coupled to a first end of the spring, where the eyelet bolt couples to the slot opening; and a clip coupled to a second end of the spring, wherein the clip is configured to removeably couple to the paint tray. In some embodiments the eyelet bolt extends through the slot opening in the cart body such that a threaded end of the eyelet bolt is available from a bottom side of the cart body and wherein the threaded end of the eyelet bolt receives a wing nut.

Disclosed is a method of forming a universal paint tray cart. The method of forming a universal paint tray cart includes the step of forming a cart body, where the cart body comprises a surface for receiving a paint tray. The method of forming a universal paint tray cart includes the step of forming a slot opening in the cart body, where the slot opening has a slot length extending between a slot first end and a slot second end. The method of forming a universal paint tray cart also includes the steps of forming a paint tray coupling device; and coupling the paint tray coupling device to the slot opening.

In some embodiments the step of forming a paint tray coupling device includes coupling a clip to a first end of a spring; coupling an eyelet bolt hole end to a second end of the spring; and threading a wing nut on a threaded end of the eyelet bolt. In some embodiments the step of coupling the paint tray coupling device to the slot opening includes removing the wing nut from the threaded end of the eyelet bolt; extending the eyelet bolt through the slot opening such that the threaded end of the eyelet bolt is available from a bottom side of the cart and the clip is available from a top side of the cart; and threading the wing nut on the threaded end of the eyelet bolt. In some embodiments forming a paint tray coupling device includes coupling a clip to a hole end of an eyelet bolt; and threading a wing nut on a threaded end of the eyelet bolt. In some embodiments forming a slot opening in the cart body comprises forming a slot opening in the cart body wherein the slot opening has a slot length of at least one inch. In some embodiments forming a slot opening in the cart body comprises forming four slot openings in the cart body, wherein each of the four slot openings has a slot length of at least three inches.

The foregoing and other features and advantages of the invention will be apparent to those of ordinary skill in the art from the following more particular description of the invention and the accompanying drawings.

DETAILED DESCRIPTION OF EMBODIMENTS OF THE INVENTION

As discussed above, embodiments of the present invention relate to painting supplies and in particular to a paint tray cart that can accept different sizes of paint trays. Painting walls and ceilings of buildings is often done using a paint roller and a paint tray. Paint is poured into the paint tray. The paint roller is placed into the paint in the paint tray in order to cover the roller with paint. The roller is then rolled over the surface to be painted, which applies the paint to the surface. Often the painter has to paint from a ladder or scaffold, and/or with an extended paint roller in order to reach high surfaces. The painter needs easy access to the paint tray, and needs to be able to move the paint tray about easily from one position to another. Disclosed is a universal paint tray cart which is mobile and easily and quickly holds various sizes of paint trays.

The disclosed universal paint tray cart has a top surface for receiving various sizes of paint trays. The universal paint tray cart also has wheels for moving the universal paint tray cart and the paint tray about as the painter moves from one place to another during painting. The universal paint tray cart includes paint tray couplers which are coupled to slot openings in the universal paint tray cart body. The paint tray couplers hold a paint tray to the paint tray cart so that the cart and the paint tray can be moved about without the paint tray falling off of the paint tray cart. The slot openings have a slot opening length extending between a slot opening first end and a slot opening second end. The paint tray couplers slide along the length of the slot opening, which allows the paint tray couplers to adjust to paint trays of various widths and lengths. In some embodiments the paint tray couplers include a spring, which allows the paint tray couplers to adjust to paint trays of various heights. Thus the universal paint tray cart is able to securely hold paint trays of a variety of sizes, holding each paint tray securely on a top surface of the universal paint tray cart.

Figure 1:
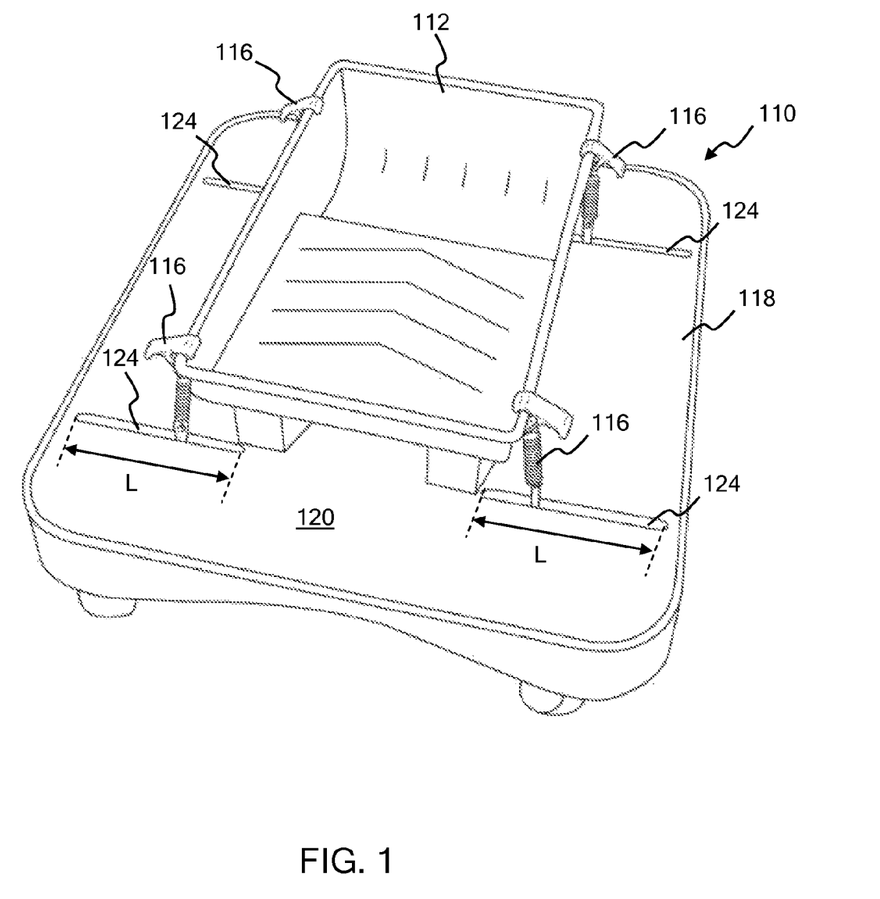
FIG. 1 is a top perspective view of one embodiment of universal paint tray cart 110 with paint tray 112.
Figure 2:
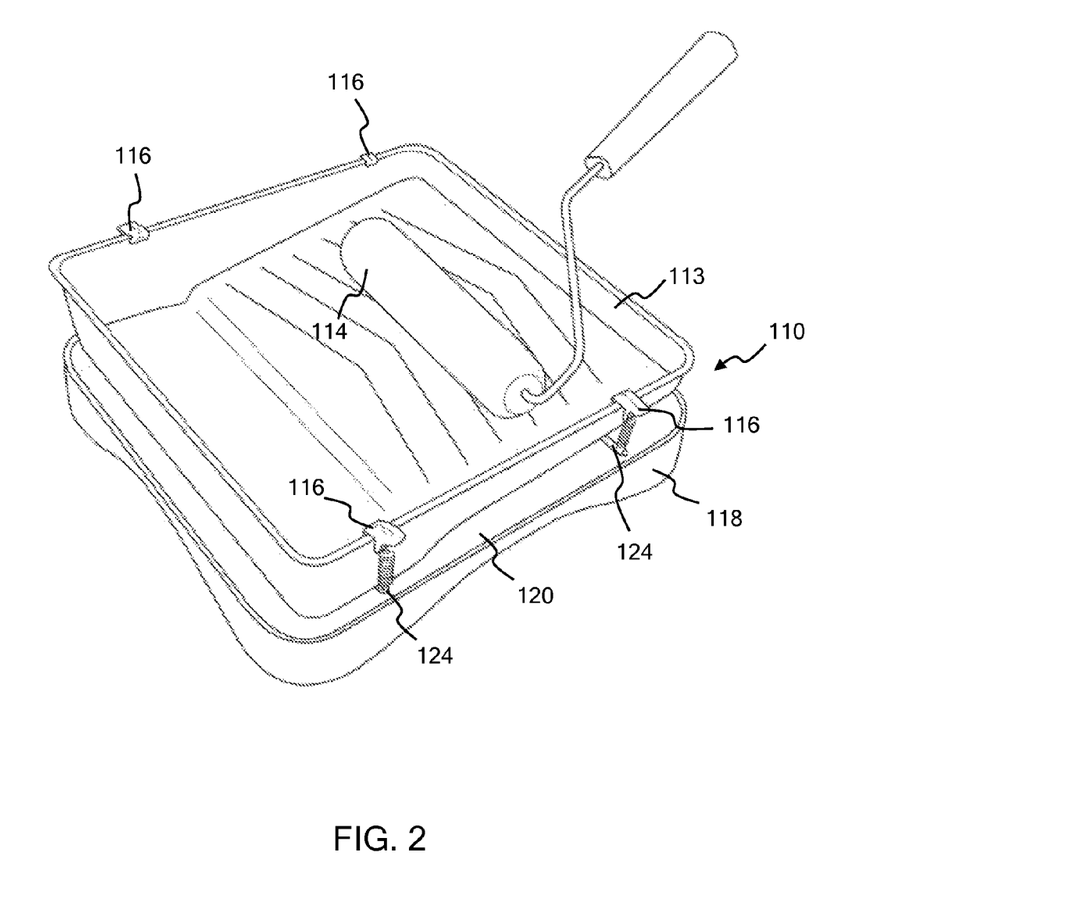
FIG. 2 is a top perspective view of universal paint tray cart 110 of FIG. 1 with paint tray 113 coupled to cart body 118, where paint tray 113 in this figure is a different size than paint tray 112 in FIG. 1.

FIG. 1 and FIG. 2 show one embodiment of the invention as universal paint tray cart 110. FIG. 1 shows a perspective view of paint tray cart 110 (also referred to as universal paint tray cart 110) with paint tray 112 coupled to it. FIG. 2 shows a perspective view of paint tray cart 110 with paint tray 113 coupled to it. Universal paint tray cart 110 includes cart body 118 with top surface 120. Top surface 120 receives paint trays such as paint tray 112 and paint tray 113. In FIG. 1 paint tray 112 is a size which covers only a portion of top surface 120 of universal paint tray cart 110. Paint tray couplers 116 hold paint tray 112 to universal paint tray cart 110. FIG. 2 shows universal paint tray cart 110 of FIG. 1, with paint tray 113 coupled to it. Paint tray 113 is larger than paint tray 112. Paint tray 113 covers much of top surface 120 of paint tray cart 110. Paint tray couplers 116 slide along length L of slot openings 124 that extend through cart body 118, allowing paint tray couplers 116 to adjust their position on paint tray 110 to hold the different sizes of paint trays 112 and 113. Paint tray coupler 116 has first end 172 (see FIG. 4 and FIG. 7) that couples to slot 124 of cart body 118. Paint tray coupler 116 has second end 174 (see FIG. 4 and FIG. 7) that is configured to removeably couple to paint tray 112 or 113. Universal paint tray cart 110 of FIG. 1 and FIG. 2 is able to securely hold the smaller paint tray 112 of FIG. 1, or the larger paint tray 113 of FIG. 2. Each paint tray 112 and 113 can be coupled to universal paint tray cart 110 and subsequently used to apply paint to paint roller 114 and facilitate painting a surface.

Figure 3:
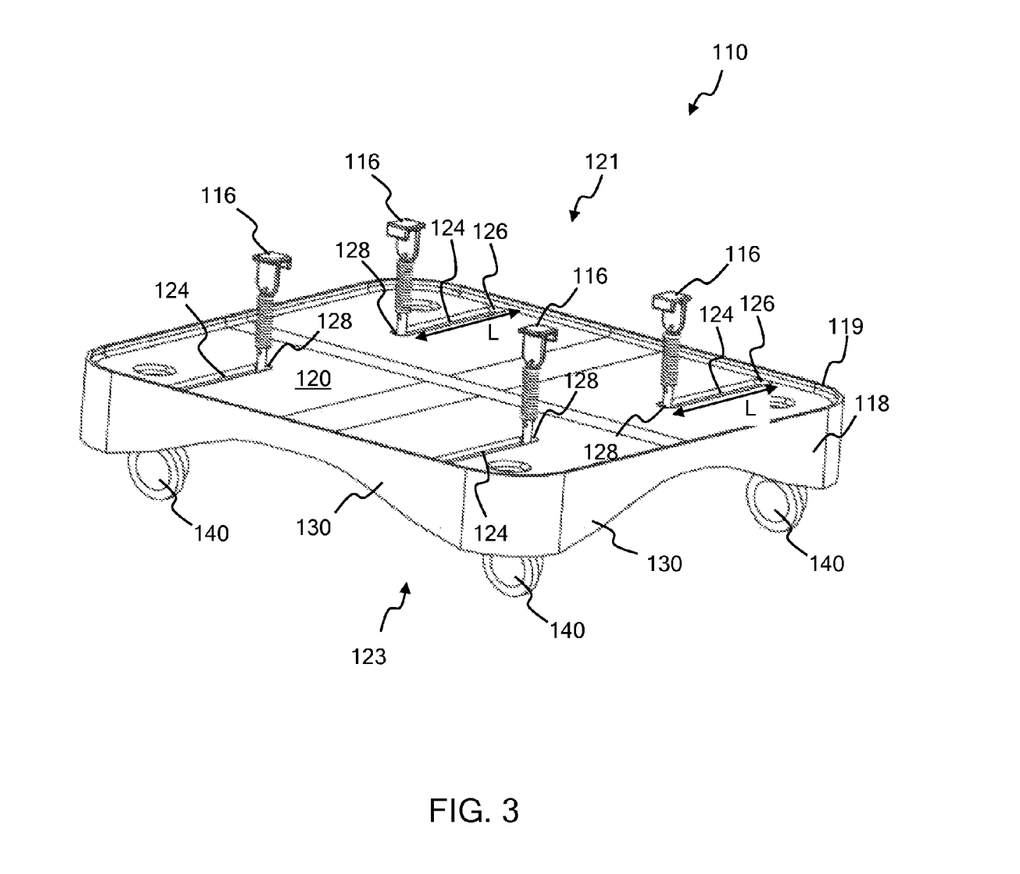
FIG. 3 is a perspective view of universal paint tray cart 110 of FIG. 1.
Figure 4:
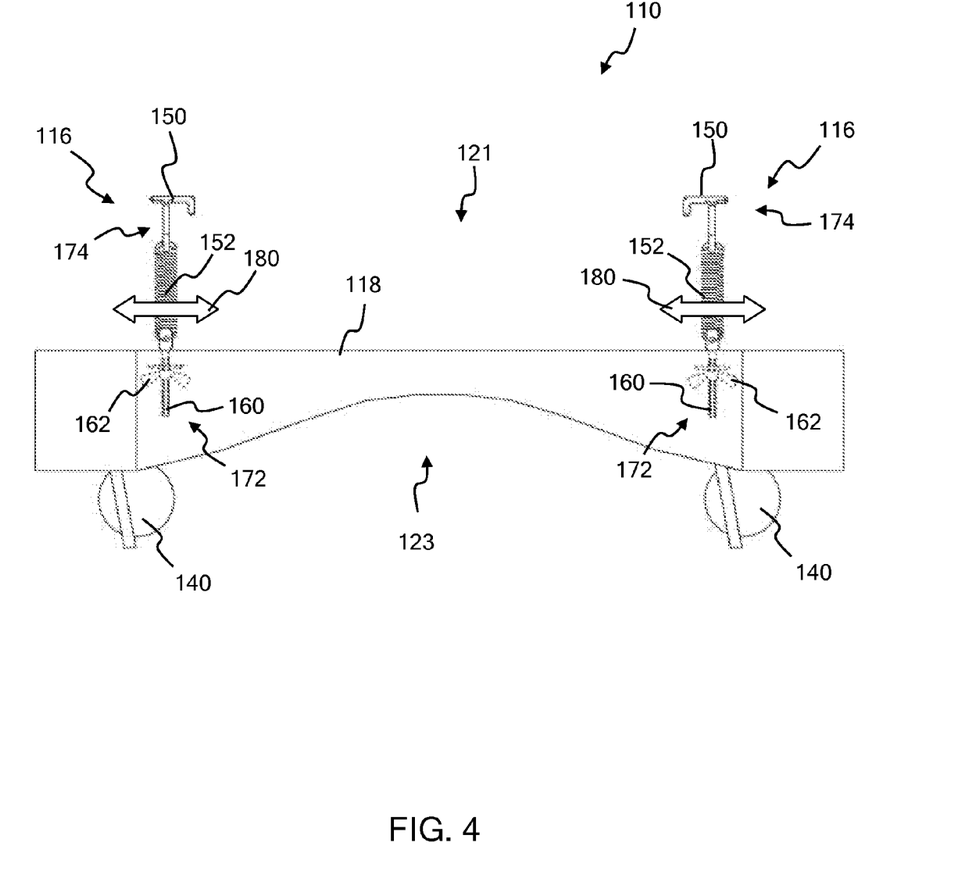
FIG. 4 is a side view of universal paint tray cart 110 of FIG. 3.
Figure 5:
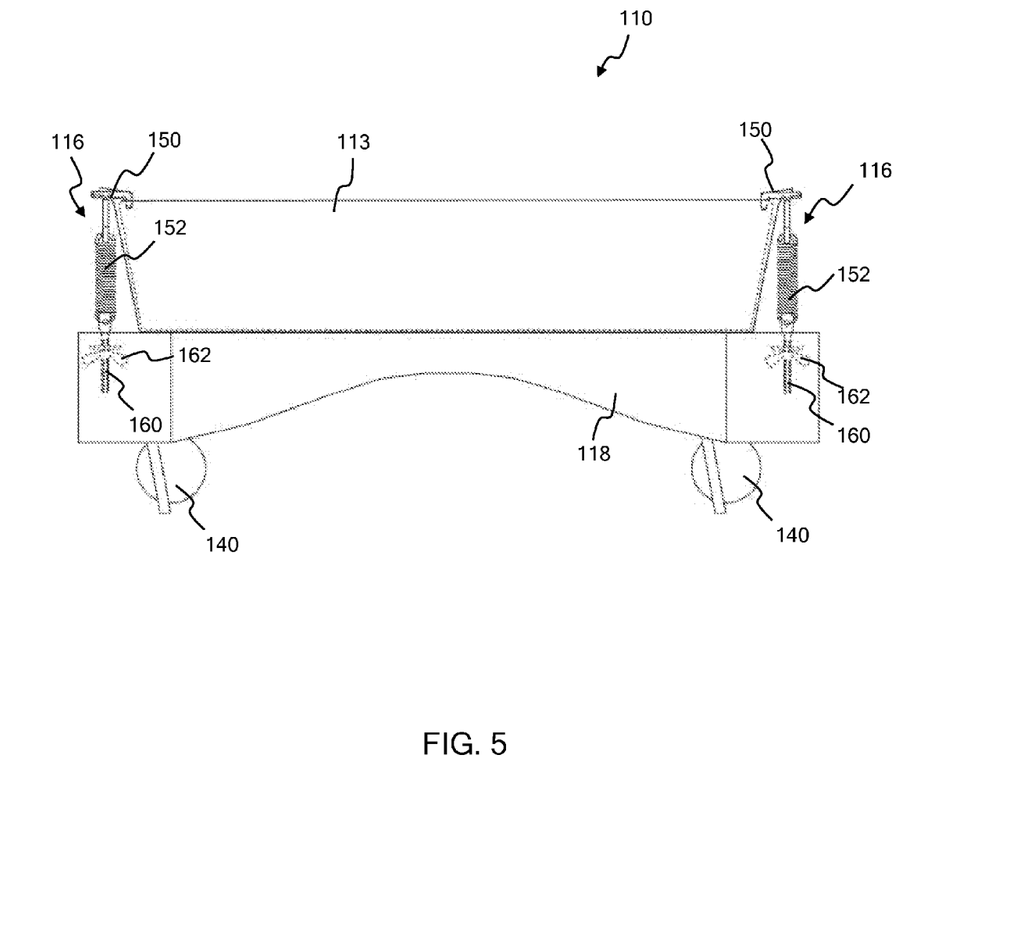
FIG. 5 is a side view of universal paint tray cart 110 of FIG. 3 with large paint tray 113 coupled cart body 118 as in FIG. 2.
Figure 6:
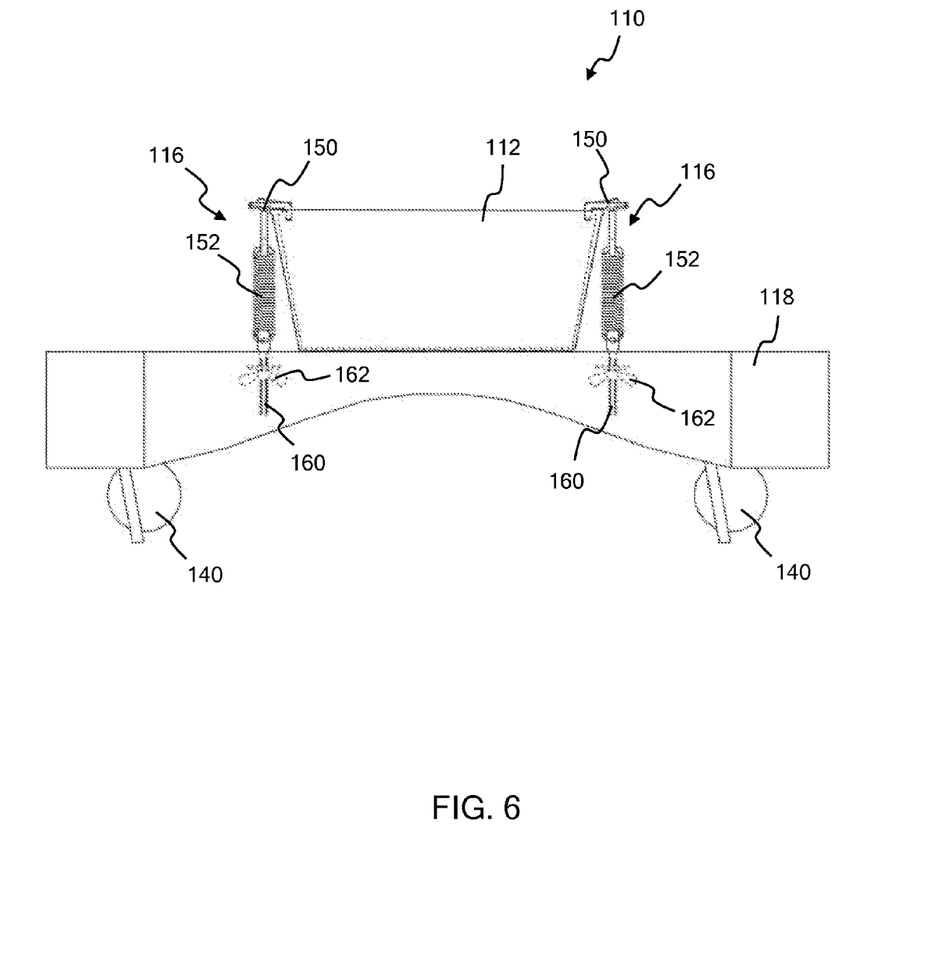
FIG. 6 is a side view of universal paint tray cart 110 of FIG. 3 with small paint tray 112 coupled to cart body 118 as in FIG. 1.

FIG. 3 through FIG. 6 show various views of universal paint tray cart 110 of FIG. 1 and FIG. 2. FIG. 3 shows a top perspective view of universal paint tray cart 110 of FIG. 1 and FIG. 2. FIG. 4 shows a side view of universal paint tray cart 110 of FIG. 1 and FIG. 2. FIG. 5 shows a side view of universal paint tray cart 110 of FIG. 1 and FIG. 2 with larger paint tray 113 coupled to paint tray cart 110. FIG. 6 shows a side view of universal paint tray cart 110 of FIG. 1 and FIG. 2 with smaller paint tray 112 coupled to paint tray cart 110.

Figure 7:
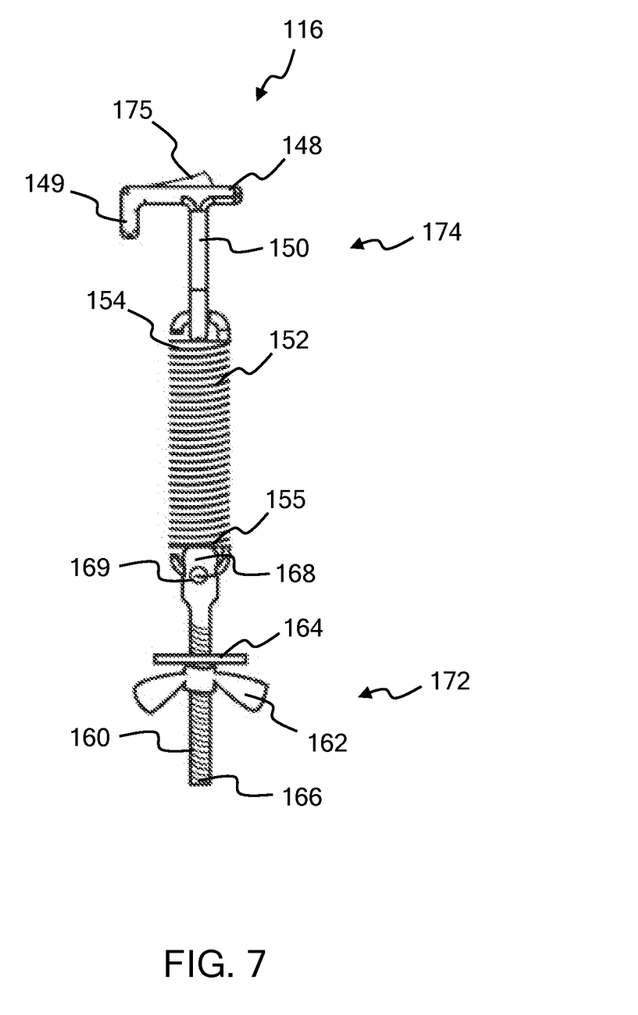
FIG. 7 is a side view of an embodiment of paint tray coupling device 116.

FIG. 7 show a side view of an embodiment of paint tray coupler 116 of universal paint tray cart 110 of FIG. 1 through FIG. 6.

Universal paint tray cart 110, also called paint tray cart 110 or cart 110, includes cart body 118, one or more than one slot opening 124 extending through cart body 118, and one or more than one paint tray coupling device 116 which couples paint tray 112 or 113 to paint tray cart 110. Cart body 118 includes top surface 120 for receiving paint trays 112 and 113. Paint trays 112 and 113 rest on top surface 120. Top surface 120 is essentially flat, and sized to receive various sizes of paint trays 112 and 113. Top surface 120 in some embodiments is ribbed, textured, or coated to keep paint tray 112 from sliding across top surface 120. In some embodiments top surface 120 has rim 119 at the perimeter of top surface 120 to keep paint trays 112 or 113 from sliding off of top surface 120. In the embodiments shown, cart body 118 also includes cart sides 130 as shown in FIG. 3.

Universal paint tray cart 110 includes one or more than one slot opening 124. Each slot opening 124 extends through cart body 118 from top side 121 of cart body 118 to bottom side 123 of cart body 118. Each slot opening 124 has a slot length L (see FIG. 1 and FIG. 3). Slot length L extends between slot first end 126 and slot second end 128. The length L of slot openings 124 provide universal paint tray cart 110 with the ability to securely hold different sizes of paint trays such as paint trays 112 and 113. Paint tray couplers 116—to be discussed in more detail shortly—are configured to slide within, or along, slot openings 124 and to couple to universal paint tray cart 110 at various points along length L of slot openings 124 to accommodate the larger or smaller width of paint trays 112 and 113. In some embodiments slot opening 124 has a length L of between 0.5 and 12 inches. In some embodiments slot opening 124 has a length L of between 1 and 10 inches. In some embodiments slot opening 124 has a length of between 2 and 8 inches. In some embodiments slot opening 124 has a length of at least one inch long. In some embodiments slot opening 124 has a length of at least three inches long. These sizes for slot length L have been found to accommodate a wide range of paint tray sizes while keeping a compact and portable size to paint tray cart 110.

In the embodiments shown, paint tray cart 110 includes four slot openings 124. Using four slot openings and paint tray couplers 116 as shown in the figures provides the capability to secure paint trays 112 or 113 to cart body 118 top surface 120 near each of the corners of the paint tray 112 or 113 as shown in FIG. 1 and FIG. 2. This reduces the likelihood of paint tray 112 or 113 tipping and spilling its paint contents. Universal paint tray cart 110 according to the invention can have any number of slot openings 124 according to the particular design, size and usage of various embodiments of universal paint tray cart 110. In some embodiments universal paint tray cart 110 has one slot opening 124. In some embodiments universal paint tray cart 110 has two slot openings 124. Two slot openings 124 allows at least two sides of a paint tray 112 or 113 to be held with paint tray couplers 116. In some embodiments universal paint tray cart 110 has three slot openings 124. In some embodiments universal paint tray cart 110 according to the invention has more than four slot opening 124. In some embodiments universal paint tray cart 110 has paint tray couplers 116 configured in each of the slot openings 124. In some embodiments universal paint tray cart 110 has paint tray couplers 116 configured in less than the number of slot openings 124.

Universal paint tray cart 110 as shown in FIG. 1 through FIG. 6 also includes set of wheels 140. Cart body 118 rolls on set of wheels 140. In some embodiments one or more of the wheels 140 can be locked. A locking wheel 140 allows paint tray cart 110 to be made immobile when needed. In some embodiments one or more of the wheels 140 are configured to lock when receiving a predetermined amount of locking pressure towards the ground. One or more than one of wheels 140 is made to lock in response to receiving an amount of locking pressure so that when a painter is on a ladder and wants to roll paint roller 114 in paint tray 112 or 113, a predetermined amount of downward locking pressure on universal paint tray cart 110 from paint roller 114 will cause one or more wheels 140 to lock. Cart 110 will not move, and the painter can apply paint to roller 114 without having cart 110 move about. The wheels unlock in response to the locking amount of pressure being removed. Thus when it is desired to move cart 110, paint roller 114 or other device can be used to put sideways pressure on paint tray 112 or 113, or cart 110, which will cause universal paint tray cart 110 to move to where it is needed. In this way a painter can move universal paint tray cart 110 easily while on a ladder, for instance, and yet can make universal paint tray cart 110 stay in place when desired.

Universal paint tray cart 110 according to the invention includes one or more than one paint tray coupling device 116. Embodiments of paint tray coupling device 116 are shown in FIG. 1 through FIG. 7. FIG. 7 shows a side view of paint tray coupling device 116. Each paint tray coupling device 116 is configured to be releasably and repeatedly coupled to universal paint tray cart 110 and communicate with a slot opening 124. Each of the paint tray coupling devices 116 may be releasably and repeatedly coupled to paint tray cart 110 via the corresponding slot opening 124 once coupling device 116 has been moved to the desired position along length L of the corresponding slot opening 124. Paint tray coupling device 116 adjustably couples paint tray 112 or 113 to cart body 118. Each paint tray coupling device 116 slides along length L of a slot opening 124 from slot first end 126 to slot second end 128 (see FIG. 3). Paint tray coupling device 116 being able to slide along length L of slot opening 124 is what allows universal paint tray cart 110 to couple to and hold different sizes of paint trays 112 or 113. For example, for large paint trays 112, paint tray couplers 116 are slid to slot opening first end 126 as shown in FIG. 2 and FIG. 5. For small paint trays 112, paint tray couplers 116 are slid towards second end 128 as shown in FIG. 1 and FIG. 6. Paint trays of differing sizes are accommodated by sliding paint tray coupling devices 116 somewhere in between first end 126 and second end 128 along length L of slot openings 124. Slot length L allows different sizes of paint trays 112 or 113 to be coupled to universal paint tray cart 110. Slot length L also allows paint trays 112 or 113 to be placed on top surface 120 in different places as desired. Slot openings 124 and paint tray couplers 116 give universal paint tray cart 110 the capability to accommodate many types and sizes of paint trays 112 and 113, and to securely and easily couple each paint tray 112 and 113 to cart body 118.

It is to be understood that the size, shape, and geometry of paint tray cart body 118, top surface 120, and slot openings 124 of universal paint tray cart 110 according to the invention can take many different forms. The embodiments shown are examples only and are not meant to be limiting. Slot openings 124 do not have to be linear, but can be curvilinear or rectilinear shapes that allow paint tray couplers 116 to be located in different positions along slot openings 124.

Figure 8:
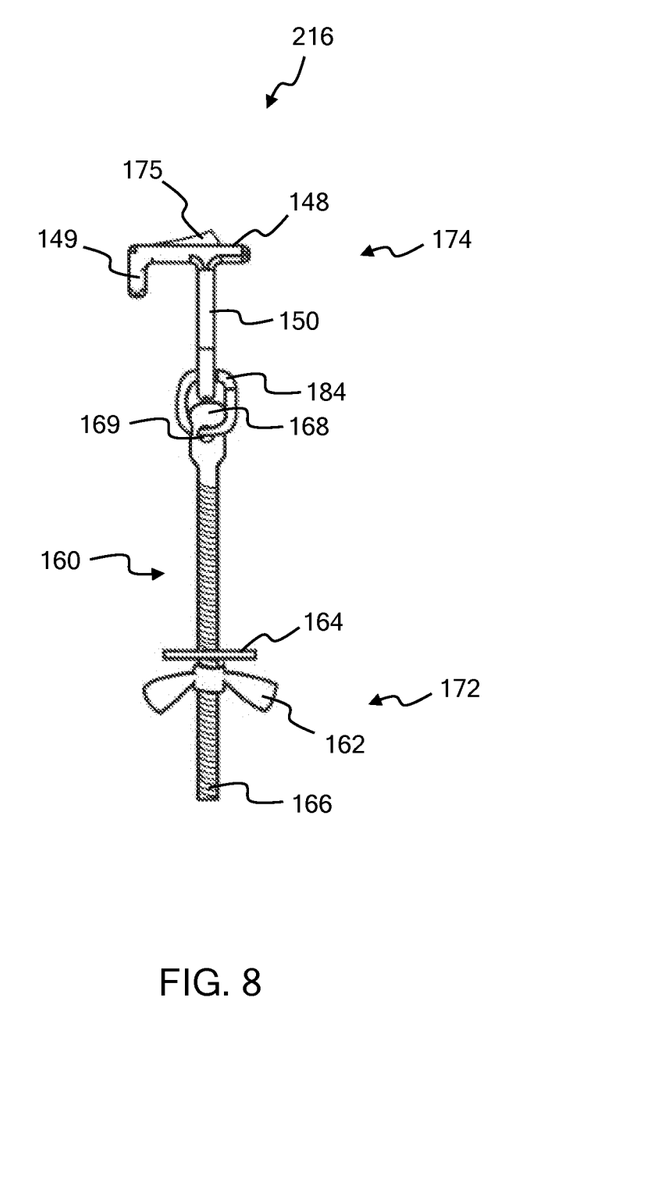
FIG. 8 is a side view of an embodiment of paint tray coupling device 216.

Paint tray couplers 116 according to the invention can take many forms. Paint tray couplers 116 can be any shape, size, or form that couples paint trays 112 or 113 to slot opening 124. Paint tray couplers 116 shown and described are examples only and not meant to be limiting. FIG. 7 shows a side view of one embodiment of paint tray coupler 116. FIG. 8 shows a side view of paint tray coupler 216. Paint tray couplers 116 and 216 each include a first end 172 that couples to a slot opening 124 in cart body 118. First end 172 couples to slot opening 124 such that paint tray couplers 116 and 216 slide along length L of slot opening 124. Paint tray couplers 116 each include a second end 174 that removeably couples to paint tray 112. Paint tray couplers 116 and 216 extend through slot openings 124 as shown in FIG. 4. Paint tray coupler 116 and 216 extends through slot opening 124 such that first end 172 is available from bottom side 123 of cart body 118, and second end 174 is available from top side 121 of cart body 118. Paint tray couplers 116 and 216 slide along slot openings 124 between slot first end 126 and slot second end 128, as shown by direction arrows 180 in FIG. 4. Paint tray couplers 116 and 216 sliding along slot openings 124 allow paint tray couplers 124 to adjust to and hold different sizes of paint trays 112 and 113 as discussed earlier.

In the embodiment of paint tray coupler 116 shown in FIG. 1 through FIG. 7, paint tray coupler 116 includes eyelet bolt 160, spring 152, and clip 150. Eyelet bolt 160 is at first end 172 of paint tray coupler 116. Clip 150 is at second end 174 of paint tray coupler 116. Eyelet bolt 160 is coupled to first end 155 of spring 152. Clip 150 is coupled to second end 154 of spring 152. Eyelet bolt 160 couples to slot opening 124 in cart body 118. Eyelet bolt 160 slides through slot opening 124 such that eyelet bolt hole 169 of eyelet tab end 168 is available from top side 121 of cart body 118. Eyelet bolt threaded end 166 is available from bottom side 123 of cart body 118. In the embodiments shown, washer 164 is slid onto eyelet bolt 160 threaded end 166 after eyelet bolt 160 has been slid through slot opening 124 from top side 121 to bottom side 123. Wing nut 162 is threaded onto eyelet bolt threaded end 166 from bottom side 123 of cart body 118. Spring 152 keeps paint tray coupler 116 from sliding through slot opening 124 from top side 121 to bottom side 123. Wing nut 162 couples paint tray coupler 116 to cart body 118 by keeping eyelet bolt 160 from sliding out of slot opening 124 from bottom side 123 to top side 121. Wing nut 162 can be threaded up or down on threaded end 166 of eyelet bolt 160 to adjust the length of paint tray coupler 116.

Eyelet bolt hole 169 is available from top side 121 of cart body 118 after eyelet bolt threaded end 166 is inserted through slot opening 124. Eyelet bolt hole 169 is coupled to spring first end 155. Spring 152 is too large to fit through slot opening 124 in this embodiment, so paint tray coupler 124 is captured in slot opening 124 once wing nut 162 is put on eyelet bolt 160. Clip 150 is coupled to spring second end 154.

Clip 150 is configured to couple to paint trays 112 and 113. Spring 152 allows the length of paint tray coupler 116 to stretch, allowing clip 150 to be coupled and uncoupled from paint tray 112, and to allow paint tray coupling device 116 to securely but flexibly hold paint trays 112 and 113 to top surface 120.

Clip 150 couples paint tray coupler second end 174 to paint tray 112 or 113. Clip hook 149 couples to the edge of paint tray 112 or 113, holding paint tray 112 or 113 on top surface 120 of cart body 118. Clip handle 148 provides an end for gripping with the hand, providing a handle 148 for coupling and uncoupling clip 150 to paint tray 112. Rib 175 give strength to clip 150, as well as providing an element for fingers to grip clip 150 with. Thus clip 150 removeably couples first end 174 of paint tray coupling device 116 to paint tray 112 or 113, as shown in the figures. Eyelet bolt 160 and wing nut 162 removably couples second end 172 of paint tray coupling device 116 to slot opening 124. Spring 152 allows paint tray coupling device to stretch and flex.

FIG. 8 shows a side view of an embodiment of paint tray coupler 216. In this embodiment spring 152 is eliminated and eyelet bolt 160 is coupled directly to clip 150 using ring 184. Paint tray coupling device 216 does not stretch or flex as much as paint tray coupling device 116. Paint tray coupling device 216 can be used in situations where it is desired to hold paint tray 112 or 113 to cart body 118 tightly with no capability to stretch paint tray coupling device 216. It is to be understood that many different forms of paint tray coupling devices are possible, those shown and described are examples only. Paint tray coupling devices according to the invention includes a first end 172 that couples to slot openings 124, and a second end 174 that couples to a paint tray. In some embodiments first end 172 is captured by slot opening 124, such as by using a ball bearing or bolt that slides along slot opening 124 but is not removeable from slot opening 124. Second end 174 can include many different coupling devices to removeably couple to a paint tray.

Figure 9:
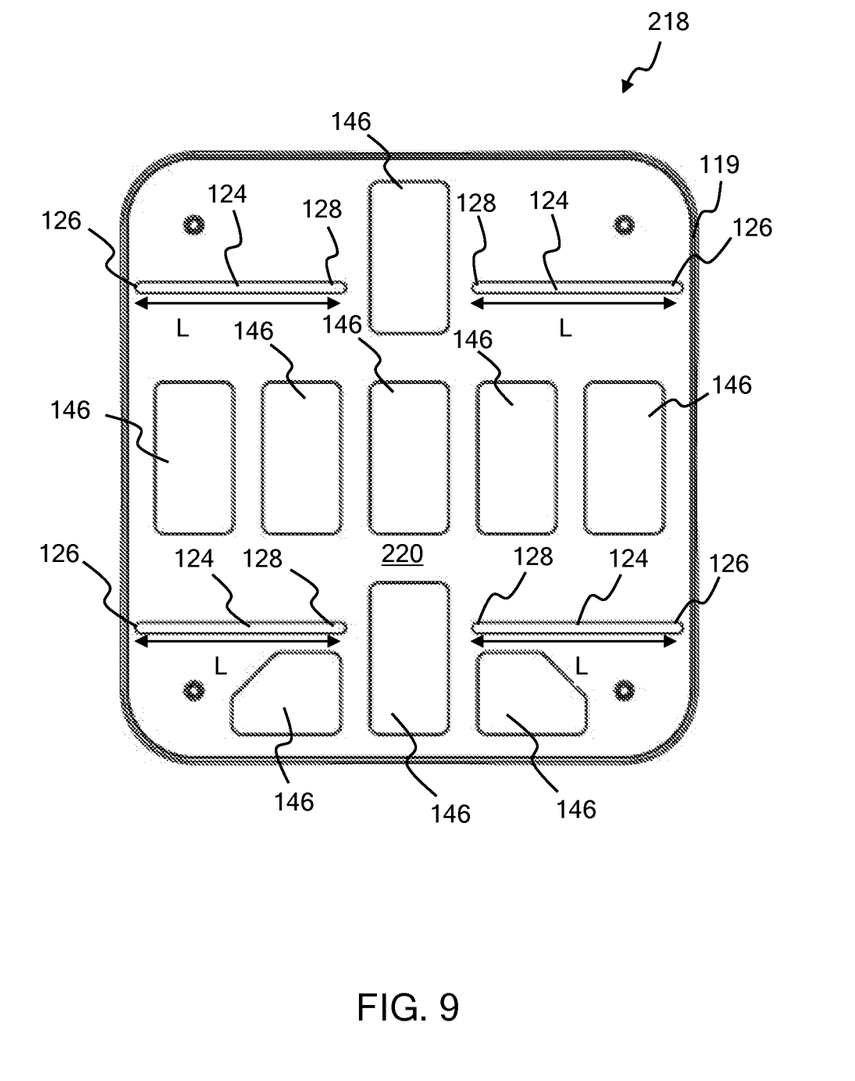
FIG. 9 is a bottom view of cart body 218 that can be used instead of cart body 118 of paint tray cart 110.

FIG. 9 shows a top view of cart body 218 that can be used with paint tray cart 110 instead of cart body 118. Cart body 218 includes four slot openings 124 as with cart body 118. Cart body 218 also has cutouts 146. Cutouts 146 are openings or cutouts in cart body 218. Cutouts 146 make cart body 218 lighter and less costly because there is less material in cart body 218.

Figure 10:
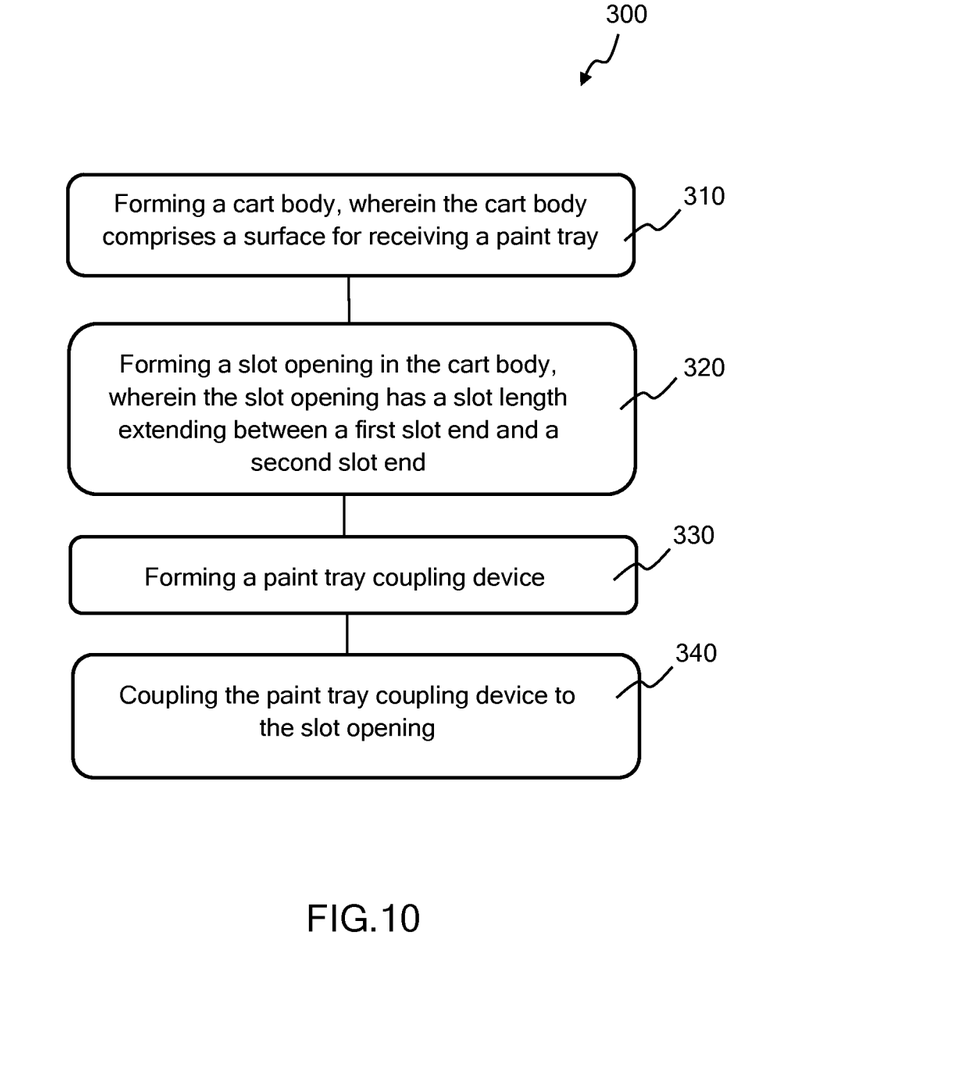
FIG. 10 illustrates method 300 of forming a universal paint tray cart according to the invention.

FIG. 10 shows method 300 of forming a paint tray cart according to the invention. Method 300 of forming a paint tray cart includes step 310 of forming a cart body, where the cart body includes a surface for receiving a paint tray. Method 300 of forming a paint tray cart also includes step 320 of forming a slot opening in the cart body, where the slot opening has a slot length extending between a first slot end and a second slot end. Method 300 of forming a paint tray cart also includes step 330 of forming a paint tray coupling device, and step 340 of coupling the paint tray coupling device to the slot opening. Method 300 according to the invention can include many other steps. In some embodiments the slot opening has a length of between 0.5 and 12 inches. In some embodiments the slot opening has a length of between 1 and 10 inches. In some embodiments the slot opening has a length of between 2 and 8 inches. In some embodiments the slot opening has a length of at least one inch. In some embodiments the slot opening has a length of at least three inches. In some embodiments the paint tray coupling device comprises an eyelet bolt where an eyelet bolt threaded end removeably and adjustably couples to the cart body. In some embodiments the paint tray coupling device comprises a spring coupled to the eyelet bolt. In some embodiments the paint tray coupling device comprises a clip coupled to the spring, where the clip is configured to couple to a paint tray.

In some embodiments step 330 of forming a paint tray coupling device includes the steps of coupling a clip to a first end of a spring, coupling an eyelet bolt hole end to a second end of the spring; and threading a wing nut on a threaded end of the eyelet bolt. In some embodiments step 330 of forming a paint tray coupling device includes the step of coupling an eyelet bolt to a spring. In some embodiments step 330 of forming a paint tray coupling device includes the step of coupling a clip to the spring. In some embodiments step 330 of forming a paint tray coupling device includes the step of forming a spring, where a first end of the spring couples to an eyelet bolt, and a second end of the spring couples to a clip. In some embodiments step 330 of forming a paint tray coupling device include the step of forming a clip. In some embodiments the step of forming a clip includes the step of placing a hole in a clip body, where the hole couples to a spring. In some embodiments the step of forming a clip includes the step of forming a clip hook, where the clip hook couples to a paint tray. In some embodiments the step of forming a clip includes the step of forming a clip handle. In some embodiments step 330 of forming a paint tray coupling device includes the step of coupling a clip to a hole end of an eyelet bolt, and threading a wing nut on a threaded end of the eyelet bolt.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above. For example, in some embodiments paint tray couplers can be rubber bands, a bungee cord, magnets or Velcro or other coupling devices.

The invention claimed is:

1. A paint tray cart comprising:
    a cart body, wherein the cart body comprises a top surface for receiving a paint tray;
    a slot opening extending through the cart body, wherein the slot opening has a slot length extending between a slot first end and a slot second end; and
    a paint tray coupling device comprising:
        an eyelet bolt;
        a clip coupled to an eyelet bolt hole end of the eyelet bolt, wherein the clip is configured to removably couple to the paint tray;
        and
        a wing nut threaded onto a threaded end of the eyelet bolt;
    wherein the paint tray coupling device is configured to couple the paint tray to the cart body, and wherein the paint tray coupling device is coupled to the slot opening, and wherein the paint tray coupling device slides along the length of the slot opening from the slot first end to the slot second end.

2. The paint tray cart of claim 1, wherein the paint tray coupling device is captured by the slot opening in response to the paint tray coupling device being coupled to the slot opening.

3. The paint tray cart of claim 1, wherein the slot length is at least one inch long.

4. The paint tray cart of claim 1, wherein the slot length is at least three inches long.

5. A method of forming a universal paint tray cart, the method comprising the steps of:
    forming a cart body, wherein the cart body comprises a surface for receiving a paint tray;
    forming a slot opening in the cart body, wherein the slot opening has a slot length extending between a slot first end and a slot second end;

forming a paint tray coupling device, wherein forming a paint tray coupling device comprises:
    coupling a clip to a hole end of an eyelet bolt; and
    threading a wing nut on a threaded end of the eyelet bolt; and
coupling the paint tray coupling device to the slot opening.

6. The method of claim 5, wherein coupling a clip to a hole end of an eyelet bolt comprises:
    coupling a clip to a first end of a spring; and
    coupling an eyelet bolt hole end to a second end of the spring.

7. The method of claim 6, wherein coupling the paint tray coupling device to the slot opening comprises:
    removing the wing nut from the threaded end of the eyelet bolt;
    extending the eyelet bolt through the slot opening such that the threaded end of the eyelet bolt is available from a bottom side of the cart and the clip is available from a top side of the cart; and
    threading the wing nut on the threaded end of the eyelet bolt.

8. The method of claim 5, wherein forming a slot opening in the cart body comprises forming a slot opening in the cart body wherein the slot opening has a slot length of at least one inch.

9. The method of claim 5, wherein forming a slot opening in the cart body comprises forming four slot openings in the cart body, wherein each of the four slot openings has a slot length of at least three inches.

10. A paint tray cart comprising:
    a cart body, wherein the cart body comprises a top surface for receiving a paint tray;
    a slot opening extending through the cart body, wherein the slot opening has a slot length extending between a slot first end and a slot second end; and
    a paint tray coupling device comprising:
        a spring;
        an eyelet bolt coupled to a first end of the spring, wherein the eyelet bolt couples to the slot opening; and
        a clip coupled to a second end of the spring, wherein the clip is configured to removeably couple to the paint tray;
    wherein the paint tray coupling device is configured to couple the paint tray to the cart body, and wherein the paint tray coupling device is coupled to the slot opening, and wherein the paint tray coupling device slides along the length of the slot opening from the slot first end to the slot second end.

11. The paint tray cart of claim 10, wherein the eyelet bolt extends through the slot opening in the cart body such that a threaded end of the eyelet bolt is available from a bottom side of the cart body and wherein the threaded end of the eyelet bolt receives a wing nut.

* * * * *